No. 778,834. PATENTED JAN. 3, 1905.
A. AICHELE.
MEANS FOR VENTILATING ELECTRICAL MACHINES.
APPLICATION FILED DEC. 7, 1903.
3 SHEETS—SHEET 1.
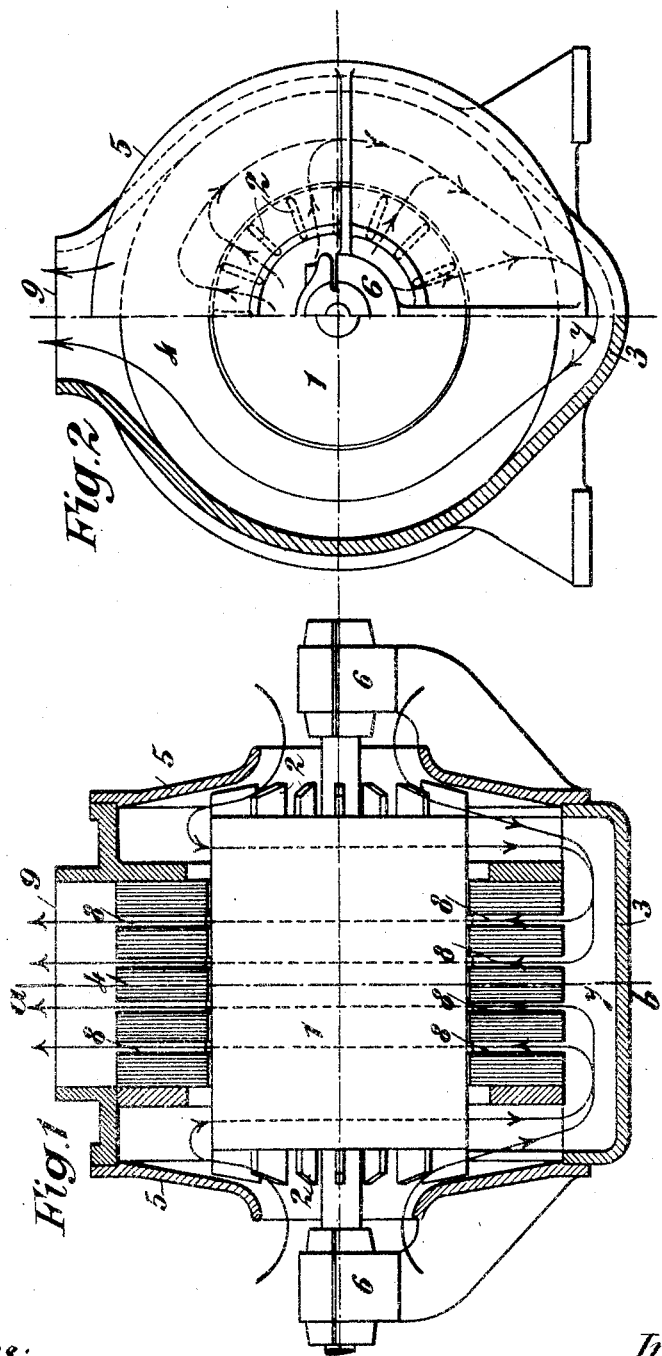
Witnesses:
Harry L. Amer
B. W. Sommers
Inventor:
Albert Aichele
by Henry Orth Jr.
atty's.

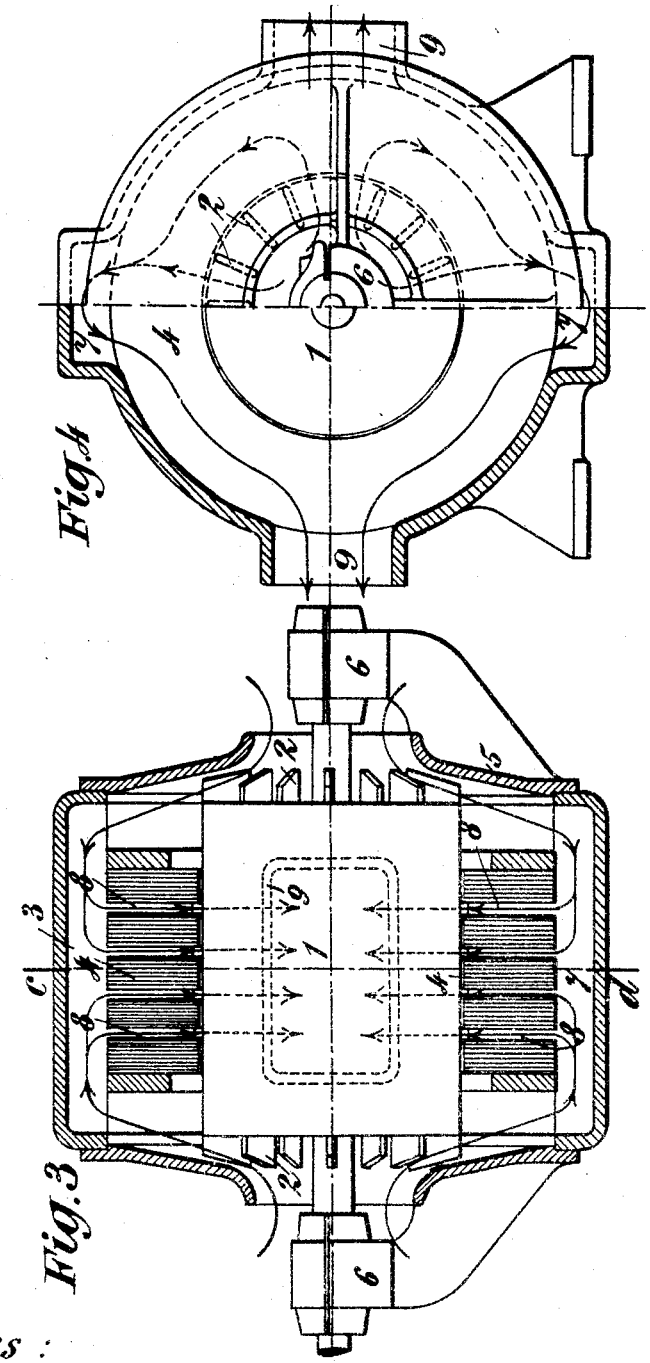

No. 778,834. PATENTED JAN. 3, 1905.
A. AICHELE.
MEANS FOR VENTILATING ELECTRICAL MACHINES.
APPLICATION FILED DEC. 7, 1903.
3 SHEETS—SHEET 3.
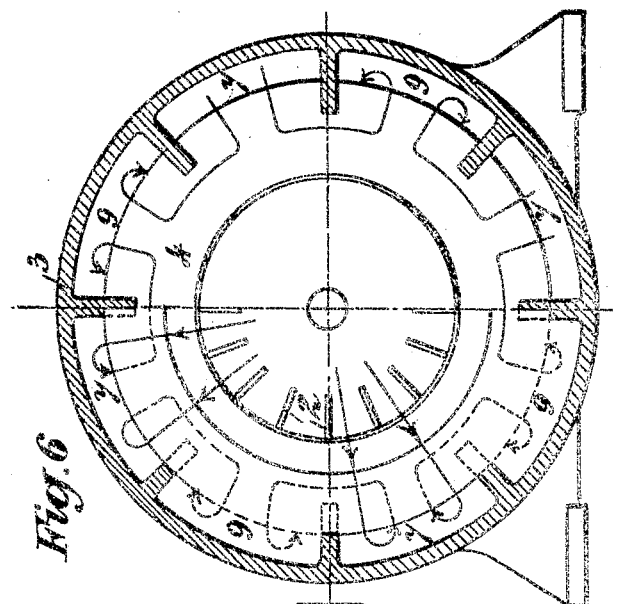
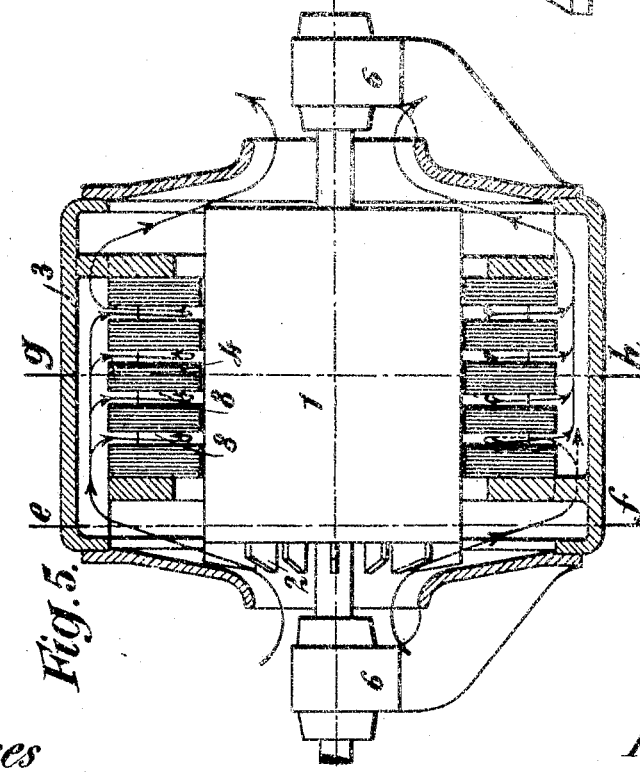
Witnesses
Harry L. Amer
B. K. Sommers
Inventor:
Albert Aichele,
by Henry Orth Jr.
att'ys.

No. 778,834. Patented January 3, 1905.

UNITED STATES PATENT OFFICE.

ALBERT AICHELE, OF BADEN, SWITZERLAND, ASSIGNOR TO THE FIRM OF ACTIENGESELLSCHAFT BROWN, BOVERI & CO., OF BADEN, SWITZERLAND.

MEANS FOR VENTILATING ELECTRICAL MACHINES.

SPECIFICATION forming part of Letters Patent No. 778,834, dated January 3, 1905.

Application filed December 7, 1903. Serial No. 184,093.

*To all whom it may concern:*

Be it known that I, ALBERT AICHELE, a citizen of the Republic of Switzerland, residing at Baden, Switzerland, have invented a new and useful Improvement in Means for Ventilating Electrical Machines, of which the following is a specification.

My invention has relation to dynamo-electric machines, and more particularly to means for cooling the stator and rotor of such machines.

Broadly speaking, the invention consists in the combination, with the stator and rotor, of an inclosing casing provided with an air-outlet and of means to establish a forced circulation of air through the casing from a point about the axis of the rotor to the periphery of the stator, thence between the coils of the latter to and about the rotor, and back between the coils of the stator into the casing to its air-outlet. The means for establishing the described circulation may be varied without departing from the spirit of my invention, as will now be fully described, reference being had to the accompanying drawings, in which—

Figure 1 is a longitudinal section, and Fig. 2 a half end elevation and half-section on line $a\,b$ of Fig. 1. Figs. 3 and 4 are views similar to Figs. 1 and 2, the half-section, Fig. 4, being taken on line $c\,d$ of Fig. 3. Fig. 5 is a view similar to Fig. 1, and Fig. 6 is a section, one half of which is taken on line $e\,f$ and the other half on line $g\,h$ of Fig. 5.

Referring now to Figs. 1 and 2, 1 is the rotor, having ventilating-vanes 2. 3 is a casing which carries the stator 4. 5 represents the covers, which also serve to support the bearings 6. As indicated by arrows, the air is drawn in at the ends near the bearings and is conveyed into the casing 3 by the vanes 2, provided on the rotor 1. At 7 is a space provided between the stator 4, which it is desired to cool, and the casing. The air is forced through the space 7 into and through the slots 8 of the stator and passes out at 9 from the casing. As will be readily understood, a current of air is thus caused to flow over and around the rotor as well as over the stator.

For the sake of simplicity the windings or coils are not shown in any of the figures of the drawings. The windings may be arranged in the usual manner.

A construction of apparatus in which the air passes out of the casing at two places (instead of at one place only, as shown in Figs. 1 and 2) is shown, by way of example, in Figs. 3 and 4.

The same reference-numerals indicate the same parts.

As hereinbefore described, the air enters at the bearings and passes into the interior of the casing, where it impinges at two places (at top and bottom) upon the periphery of the stator 4, flows through the latter in the direction of the arrows, and passes out of the machine at 9 9.

Figs. 1 to 4 show constructions having only one or two places for the exit of air. Any desired number of such exits may, however, be provided. This will be of advantage, especially in the case of very large four-pole machines.

Figs. 5 and 6 show, by way of example, a construction in which the air is drawn in at the bearing at one end only of the machine and leaves the machine at the bearing at the other end. The reference-numerals already employed for the several parts of the machine apply in this case also. The air enters at one end near the bearing, is forced into the casing and enters the stator at four places 7 7, (the number of these places may of course be made larger or smaller at will,) flows through the slots 8 and out of the slots at 9, and then escapes from the machine near the bearing situated at the end opposite to that at which it entered. As shown in Fig. 5, the rotor is fitted in this case with vanes only on one side—namely, the entrance side—while there are no vanes at the other end—that is to say, at the exit for the air.

From the description of the drawings it will be understood that the air in all cases after it has entered the casing inclosing the stator and rotor flows to the periphery of said stator, thence between its windings to and about the rotor, and back to the periphery of the stator, and finally out of the casing either at its periphery or at one of its ends. Consequently the improved means differ substantially from the means hitherto employed, in which the rotor is usually provided with apertures in the neighborhood of the shaft, through which the air is drawn in and is thence led through suitable slots to the outer periphery of the rotor, where it is either deflected directly or also flows through the stator in a radial direction and then escapes at the outer periphery of the machine. In the usual means hitherto employed the air-current flows from the smallest diameter of the parts to be cooled radially to the outer periphery, whereas according to this invention the air after it has entered the casing is caused to enter the part of the machine to be cooled at the outer periphery thereof and to flow through the said part circularly or in a peripheral direction instead of radially and to escape from the said part at the outer periphery thereof.

Instead of drawing in the air by means of vanes 2, provided on the rotor, the air may also be conducted by means of a separate fan to the desired place in the casing.

It is to be understood that the improved means may be combined with the usual ventilating arrangements hitherto employed.

Having now particularly described and ascertained the nature of the said invention and in what manner the same is to be performed, I declare that what I claim is—

1. The combination with the rotor and stator of a dynamo-electric machine, said stator having passages between its windings and an inclosing casing for said stator and rotor provided with one or more air-outlets; of means to establish a forced circulation of air from the center of the casing about the axis of rotation of the rotor to the periphery of the stator through the passages between its windings to the rotor and through passages between the windings of the stator to its periphery and to the air outlet or outlets in the casing.

2. The combination with the rotor and stator of a dynamo-electric machine, said stator having radial passages between its windings and an inclosing casing for said stator and rotor having one or more air-outlets; of means for establishing a forced circulation of air from opposite directions and from the center of the casing around the axis of rotation of the rotor to the periphery of the stator, through its passages to the rotor and through passages between the windings of the stator to its periphery and to the air outlet or outlets.

3. The combination with the rotor and stator of a dynamo-electric machine, said stator having passages between its windings, and an inclosing casing for said stator and rotor having one or more air-outlets; of means to establish a forced circulation of air from the center of the casing around the axis of rotation of the rotor, around the ends thereof to the periphery of the stator through the passages between its windings to the rotor and through passages of the stator to the air outlet or outlets.

4. The combination with the stator and rotor of a dynamo-electric machine, said stator having passages between its windings and said rotor having suction and forcing fan-blades at one or both ends; of a casing inclosing the stator and rotor and the fan-blades of the latter, said casing having air admission and exhaust ports so arranged as to establish a forced circulation of air to the periphery of the stator, through the passages thereof to and about the rotor and through said passages back to the periphery of said stator and thence out of the casing.

In testimony whereof I have signed my name to this specification in the presence of two subscribing witnesses.

ALBERT AICHELE.

Witnesses:
   A. LIEBERKNECHT,
   MORITZ VEITH.